United States Patent Office 2,840,542
Patented June 24, 1958

2,840,542

ETHERIFIED PHENOLIC RESINS

James H. Freeman, Hempfield Township, Westmoreland County, and Leonard E. Edelman, Penn Township, Allegheny County, Pa., assignors to Westinghouse Electric Corporation, East Pittsburgh, Pa., a corporation of Pennsylvania No Drawing. Application January 28, 1955
Serial No. 484,824

5 Claims. (Cl. 260—58)

The present invention relates to phenol-aldehyde resins wherein a predetermined number of the phenolic hydroxyl groups are converted to ether groups, and to processes for preparing the same, and the resulting improved resinous products.

Since phenol-aldehyde resins are easy to manufacture and possess many valuable properties, they have been put to widespread use in industry. Structurally, such resins constitute a more or less open network of phenolic nuclei joined by methylene bridges between the positions ortho and para to the phenolic hydroxyl groups. In preparing such resins, by reacting an aldehyde with a phenol, intermediate compounds known as hydroxylbenzyl alcohols or methylophenols are initially formed. The reactions involved in both the initial stages of admixture of the aldehyde with the phenol, and the subsequent condensation under the influence of heat and certain catalysts, either acidic or basic, are all predicated upon the activation of certain of the hydrogen atoms of the benzene nucleus by the presence of the phenolic hydroxyl groups.

However, the finished phenolic resin contains the phenolic hydroxyl groups. It is believed that the presence of such free hydroxyl groups, which are highly polar, in the resin causes electrical equipment insulated with such resins to exhibit high dielectric losses in alternating-current fields. Since the resins also are slightly acidic they have relatively poor resistance to alkalies. They also are prone to oxidize whereby they frequently darken in color and deteriorate on exposure to air at elevated temperatures over long periods of time. Moreover, since the water affinity of such polar phenolic hydroxyl groups is relatively high, the resins have rather poor moisture resistance properties.

Thus, while the phenolic hydroxyl groups are required to enable the resin forming condensation reaction to occur, their presence in the final resin product frequently is not advantageous and often is quite undesirable.

Heretofore, attempts have been made to block the phenolic hydroxyl groups present in phenol-aldehyde resins by either esterifying or etherifying the hydroxyl groups after resinification has been completed. The processes suggested heretofore to this end have not been completely satisfactory, however, because they have been difficult to carry out and expensive to practice. Nor has total etherification been achieved by such methods. Blocking of the hydroxyl groups prior to resinification has proved detrimental since the resulting modified phenols are nonreactive with aldehyde, and no usable resins could be produced.

Phenol-aldehyde resins in which substantially all of the phenolic hydroxyl groups are converted to ether groups do not have the disadvantages and limitations associated with phenol-aldehyde resins in which none of the hydroxyl groups are etherified. It also has been determined, however, that phenol-aldehyde resins in which all the phenolic hydroxyl groups are converted to ether groups are not desirable in all applications. For example, the totally etherified resins do not adhere well to metals such as aluminum and copper. Adherence to such metals is much improved when the resin contains a quantity of non-etherified hydroxyl groups. Moreover, phenol-aldehyde resins containing a certain number of free polar hydroxyl groups possess higher dielectric constants than comparable resins in which all the hydroxyl groups are blocked with ether groups.

The object of the present invention is to provide phenol-aldehyde resins wherein a predetermined number of the phenolic hydroxyl groups are converted to ether groups by etherifying methylolphenols and heating the etherified compounds, either alone or in admixture with other phenolic compounds, in the presence of an acid catalyst to produce a resin comprising methylene bridged phenol units.

Another object of the present invention is to provide a method for preparing phenol-aldehyde resins in which a predetermined number of the phenolic hydroxyl groups are converted to ether groups by etherifying the hydroxyl groups present on certain methylolphenol compounds and linking the etherified methylolphenol compounds by methylene bridges formed between the methylol groups of some of the compounds and hydrogen atoms in positions ortho and para to the etherified hydroxyl group on other of the compounds.

Other and further objects of the invention will, in part, be obvious and will, in part, appear hereinafter.

In accordance with the present invention and in the attainment of the foregoing objects, there is provided a process which includes establishing a mixture of methylolphenol compounds in which the ratio of methylol groups to phenolic nuclei is within the range of from 1.0 to 1.5 and etherifying the phenolic hydroxyl groups on the methylolphenol compounds. The etherified methylolphenol compounds then are azeotropically distilled in an anhydrous, non-alcoholic, water immiscible solvent therefor in the presence of an acid employed in an amount and concentration sufficient to maintain the azeotropic solution at a pH no greater than 4, when measured in an equal parts mixture with water. There is obtained as a residue, a resin composed of methylene bridged phenol units in which a predetermined number of the phenolic hydroxyl groups are converted to ether groups. It is possible, through the practice of this invention, to prepare resins wherein any desired number, for example, from 75% to 100% of the phenolic hydroxyl groups contained therein, are etherified.

Phenol-aldehyde resins prepared in accordance with the process of this invention are highly resistant to both acids and alkalies, even on heating, have a low power factor, and an adequate dielectric constant. They may be employed successfully in producing laminated products as well as in molding and coating compositions. They may be produced in the thermosetting and thermoplastic forms. The thermoset materials are quite flexible at the gel point and at higher states of polymerization whereby they are useful in postforming applications. They are tough and flexible at room temperatures and can be cold punched without sticking or crumbling at the edges which properties make them well suited for use as punch-plate resins.

In preparing the etherified phenol-aldehyde resins of the present invention a phenol and an aldehyde are reacted to an initial product comprising a mixture of methylolphenols. Any one of a variety of reactive phenols including, for instance, phenol, ortho cresol, meta cresol, or para cresol, isopropyl phenol, xylenols, naphthol, hydroquinone and resorcinol or mixtures thereof may be used. The particular phenol chosen is reacted with an aldehyde, such as formaldehyde, paraformaldehyde, acetaldehyde or butyraldehyde, in the presence of a strong alkali such as the hydroxides of sodium, potassium, lithium, calcium, barium or magnesium. Such reactions are well known in the art and yield a mixture of methylolphenols having from 1 to 3 methylol groups per benzene ring in the positions ortho and para, to the phenolic hydroxyl group. The amount of alkaline catalyst employed in carrying out the condensation reaction may vary from as little as 0.05% by weight of the phenol to an amount equal to one equivalent weight based on the weight of the particular phenol employed. Usually from 0.5 to 2% of alkali is sufficient. In those instances where less than one equivalent weight of alkaline catalyst is used, sufficient alkali to make one equivalent is added to the initial reaction product after completion of the reaction and prior to the etherification step.

The amount of phenol and aldehyde employed in preparing the initial product preferably is adjusted whereby the resultant mixture of methylolphenol compounds contains a ratio of methylol groups to phenolic nuclei within the range of from 1.0 to 1.5. The manner and time at which this particular ratio of methylol groups to phenolic nuclei is achieved is unimportant. Thus, an amount of aldehyde may be originally reacted whereby a ratio of methylol groups to phenolic nuclei greater than 1.5 is obtained in the methylolphenol compounds. This ratio then may be reduced, after etherification, to an amount within the range set forth hereinabove by adding thereto a phenol ether having less than 1.5 methylol groups per benzene ring whereby a mixture of methylolphenol compounds is produced in which the ratio of methylol groups to phenolic nuclei is within the range of 1.0 to 1.5. The phenol ether added to make such an adjustment in the ratio may be one such as anisole or methyl phenyl ether, a material which has no methylol groups, or ortho methoxy benzyl alcohol, a material which has one methylol group per nucleus. It is essential that the number of methylol groups does not exceed the number of the remaining ortho and para hydrogen atoms in order to prevent the formation of dibenzyl ether linkages by reaction between two methylol groups.

It is an important feature of the present invention that the second phenol ether added to adjust the ratio of methylol groups to phenol nuclei of the reaction product to within the range set forth hereinabove need not be the same ether as that of the methylolphenol compound, nor is it necessary that it be derived from the same phenol. It is possible, therefore, to obtain a wide variety of resins of varying properties. For example, ether groups having added functionality such as allyl or epoxy ethers may be introduced into resins composed primarily of relatively unreactive alkyl phenyl ethers to produce any desired proportion of reactive ether groups. Consequently, the resulting mixture of etherified methylolphenols will not only polymerize by condensation but also cross-link through reaction between allyl or epoxy or other functional ether groups.

Similarly, ethers of difunctional phenols, such as para cresol, may be introduced into reaction products composed predominately of trifunctional methylolphenols. Furthermore, a mixture of methylolphenol ethers having methylol groups in an amount such that the ratio is below 1.0 may be modified by the addition thereto of polymethylolphenol ethers such as 2,4-dimethylol phenyl methyl ether, 2,4,6-trimethylol phenyl methyl ether, and 2,4,6-trimethylol allyloxyphenyl ether.

The mixture of methylolphenol compounds thus prepared, having a ratio of methylol groups to phenol nuclei within the range of 1.0 to 1.5, then is treated with etherifying agents to convert the phenolic hydroxyl groups thereon to ether groups. A variety of etherifying agents may be used. Suitable examples include dimethyl sulfate, diethyl sulfate, diazomethane, methyl iodide, methyl bromide, allyl bromide, allyl chloride, benzyl chloride and epichlorohydrin. If such reactants as allyl chloride are employed, the etherification is best carried out in a pressure vessel.

The etherified methylolphenol compounds are not ordinarily reactive with the usual resin forming reagents such as formaldehyde and hexamethylenetetramine. We have discovered, however, that the etherified methylolphenol compounds will react under certain specified conditions to produce a resin with methylene bridged phenol units. The conditions necessary to carry out the resin forming reaction include an azeotropic distillation to remove water formed in the reaction. In carrying out this reaction, the mixture of etherified methylolphenol compounds is dissolved in an anhydrous non-alcoholic, water immiscible solvent and azeotropically distilled in the presence of an acid catalyst. Inorganic and organic acids, examples of which include sulfuric acid, hydrochloric acid, para toluene-sulfonic acid and boron trifluoride, or mixtures thereof, may be used. Strong oxidizing acids such as nitric acid, perchloric acid and the like obviously should not be used because of their detrimental effect on the organic product. The acid is employed in an amount and a concentration sufficient to establish and maintain the acidity of the mixture at a pH no greater than 4, when measured in an equal parts mixture with water. It is essential that the pH of the mixture be no greater than 4 since it has been determined that when the reaction is carried out in a less acid medium the formation of dibenzyl ether linkages between two methylol groups occurs rather than the desired methylene bridge formation between a methylol group on one phenol nuclei and a hydrogen atom in a position either ortho or para to the hydroxyl group on another phenolic nuclei. In alkaline medium little reaction occurs or is too slow to be of practical value.

The solvent used in carrying out the azeotropic distillation reaction may be any non-alcoholic liquid solvent which forms an azeotrope with water. Solvents which have proved to be particularly suitable include aromatic hydrocarbons such as benzene, toluene or xylene. Other satisfactory solvent materials include ethylene chloride, propylene chloride, diisobutyl ether, diisoamyl ether, methyl ethyl ketone, and methyl n-propyl ketone. Alcohols should not be used because they tend to form ethers with the methylol groups themselves thus hindering the completion of the desired reaction of methylene bridge formation.

Certain properties of the resins can be varied by appropriate modifications in formulation during the process of manufacture. For example, the resins as produced are thermosetting, without addition of any subsequent material or catalyst, as long as a trifunctional phenol is employed and the ratio of methylene bridges to phenolic nuclei is greater than 1.0. The gel time decreases as the ratio of methylol groups approaches 1.5. The brittleness of the thermoset resin also increases with the higher ratio of methylol groups due to a greater number of cross links.

The presence of residual acid from the catalyst in these resins, while it contributes to a shorter gel time, may be undesirable for applications where electrical properties are of chief concern. The presence of acids also has been found to impair the high temperature resistance properties of the resins.

Where necessary or advisable, the acid catalyst may be removed from our resins by adding to the resin in an aromatic hydrocarbon solvent, a small amount of a powdered oxide orr hydroxide of an alkaline earth metal, such as calcium oxide, barium oxide or calcium hydroxide, and heating the solution with stirring to a temperature of about 80° C. The salts formed and the excess metal oxide are then removed, for example, by filtering the hot solution. The resultant resins are still thermosetting but have a longer gel time. In order to reduce the gel time after the acid is removed, or to bring about gelation when the proportion of methylol groups is too low to permit cross linking through methylene bridges, or when the phenol is only difunctional, it has been found advantageous to modify the resins by introducing allyl ether groups. These ethers have a double bond available and can undergo cross linking by olefinic addition polymerization at the temperatures employed.

In order to increase flexibility, reduce brittleness, and improve the thermal stability of the final resin to its highest extent, it is desirable that cross linking between chains of methylene bridged phenolic nuclei should not take place between every phenol nucleus but be spaced out along the chains, preferably at uniform intervals. This result may be achieved by modifying the formulations containing a trifunctional phenol by adding thereto an ether of para cresol or other difunctional phenol before the final resin forming reaction step is carried out. The components can be varied to create a composite resin having any desired proportions of the two types of phenol nuclei. A resin containing predominantly para cresol units can be made thermosetting either by introducing allyl groups in the ether or by adding a methylolphenyl ether such as 2,4-dimethylol phenyl methyl ether or 2,4,6-trimethylol phenyl methyl ether.

In order to indicate more fully the advantages and capabilities of the process of the present invention, the following specific examples are set forth.

*Example 1*

To a solution of 80 grams (2 moles) of sodium hydroxide dissolved in 80 milliliters of water was added 188 grams (2 moles) of phenol (hydroxy benzene). The solution was cooled and 200 milliliters of methyl alcohol was added thereto. Thereafter, 242 grams of a 37% formalin solution (3 moles formaldehyde) was added. The resultant mixture was cooled to a temperature below 45° C. and allowed to stand for three days until the odor of formaldehyde disappeared. A solution of 266 grams (2.2 moles) of allyl bromide dissolved in 250 milliliters of methanol then was added. The resultant mixture then was refluxed at 75° C. for 45 minutes during which time the pH of the mixture dropped from 10 to 2, indicating completion of the reaction and hydrolysis of excess allyl bromide. The mixture was then made alkaline by the addition of sodium hydroxide pellets and the methanol then was removed by distillation. On cooling, the mixture separated into two layers. The lower aqueous layer was discarded and the upper organic layer was diluted with toluene to reduce its viscosity and provide a fluid mixture of methylol substituted allyl-phenyl ethers, having a ratio of methylol groups to phenolic nuclei of 1.5. Substantially all of the phenolic hydroxyl groups were etherified.

*Example 2*

The process of Example 1 was repeated with the exception that excess dimethyl sulfate was substituted for the allyl bromide and the methanol used to dissolve the latter was omitted. An additional equivalent of sodium hydroxide was used to balance the dimethyl sulfate. The reaction took a somewhat longer period of time to go to completion than did that of Example 1. The product comprises methylol substituted methylphenyl ethers.

*Example 3*

The process of Example 1 was repeated except that diethyl sulfate was substituted for the allyl bromide and the methanol solvent therefor was omitted. The product comprises methylol substituted ethylphenyl ethers.

*Example 4*

A measured proportion of the toluene solution of the mixture of allyl-phenyl ethers prepared as described in Example 1, was placed in a flask fitted with a thermometer, stirrer and Dean-Stark trap for collecting and measuring water evolved during azeotropic distillation. One percent by weight, based on the weight of the methylolphenyl ether compounds, of para toluenesulfonic acid then was added to reduce the pH of the mixture to below 2. The solution was azeotropically distilled and by the time the temperature had reached 135° C., evolution of water had ceased. The resins solid content of the solution was 59%. The resin had a gel time of 4 minutes at 150° C. After 20 additional minutes of cure at 150° C., the resin was found to be completely cured to a thermoset tough and flexible solid body.

*Example 5*

A sample of the toluene resin solution prepared in accordance with the method described in Example 4 was treated with powdered barium oxide to neutralize the acid catalyst present therein. One gram of barium oxide was added for each gram of acid used as the catalyst. The mixture was heated to 80 to 90° C. to expedite the neutralization and then filtered to remove the barium salts and excess barium oxide. As a result of this treatment, the pH of the solution rose from 2 to about 6. A sample of the neutralized resin had a gel time of 10 minutes at 150° C. An additional 10 minutes cure at 180° C. resulted in a thermoset, hard resin cake that was more brittle than the cured resin body of Example 4.

*Example 6*

A laminated board ⅛ inch in thickness was prepared using the acid-free resin of Example 5. Sheets of paper impregnated with the solution of the acid-free resin were superimposed upon one another to form the laminate and then cured for 3 hours at 150° C. The laminated board thus produced had a power factor at 25° C. of 0.9% at 60 cycles and of 0.7% at 1 kilocycle. The dielectric constant of the board was 2.25 at both frequencies.

A satisfactory ⅛ inch thick laminated board also was prepared from this resin using glass cloth instead of paper as the filler.

*Example 7*

The acid removal process of Example 4 was repeated using the toluene solution of methylolphenyl ethers prepared as described in Example 2. The acid free resin obtained had a gel time of about 20 minutes at 150° C.

*Example 8*

The process of Example 4 was repeated with the exception that para methylanisole was added to the allyloxyphenyl ether to produce an equimolar mixture, and this mixture was then neutralized as indicated. The resin obtained possessed an average of one difunctional unit for every two trifunctional phenyl units in the structure. After removal of the acid catalyst, the gel time was 110 minutes at 180° C. The cured resin was more flexible than that of Example 4.

All of the resins prepared in accordance with the procedures described in Examples 1 through 8 were subjected to thermal resistance tests wherein loss in weight was determined for a thin section on exposure to 250° C. in air for intervals up to 400 hours. The resins exhibited a weight loss of only about 4% to 6% after 400 hours and no apparent change in visible properties except for a slight shrinkage, slight embrittlement, and a darkening in color. Subjected to the same test, but in an inert atmosphere, for example nitrogen, these resins lose only from 1% to 3% of their weight in the first 2 to 4 hours after which further losses are negligible.

These resins possess a distinct advantage over phenol-aldehyde resins prepared in accordance with processes known in the prior art in that the present resins are essentially completely reacted and do not require a period of prolonged prior conditioning at elevated temperatures.

The resins prepared as described in Examples 1 through 8 have all of their phenolic hydroxyl groups converted to ether groups. In certain applications, it is desirable that resins be produced in which there are some phenolic hydroxyl groups which are not etherified. In some instances, for the enhancement of certain properties it is desirable that the resin contain a predetermined number of free hydroxyl groups. Such a result may be obtained by subjecting to azeotropic distillation in the presence of an acidic catalyst, the mixture of methylolphenyl ether compounds in combination with a phenol having a free phenolic hydroxyl group and available hydrogen atoms in the positions ortho and para to said phenolic hydroxyl group. Examples of suitable phenols include phenol, ortho, meta or para cresol, isopropyl phenols, xylenols, naphthol, hydroquinone and resorcinol, and mixtures of any two or more of the phenols.

When a mixture of methylolphenyl ether compounds and a phenol having a free phenolic hydroxyl group is azeotropically distilled in an anhydrous, water immiscible solvent in the presence of an acid catalyst, a phenol-aldehyde resin is formed composed of methylene bridged phenol units in which a predetermined number of the phenolic hydroxyl groups have been converted to ether groups. In such a reaction, the methylol groups of the methylolphenyl ether compounds are linked with the hydrogen atoms in the positions ortho and para to the free hydroxyl group present on the added phenol compound. The following examples illustrate the above reaction.

*Example 9*

A mixture of methylolphenyl ether compounds prepared in accordance with the procedure described in Example 1 was azeotropically distilled in accordance with the procedure described in Example 4. In carrying out the azeotropic distillation, an amount of phenol equal to 20 mole percent of the methylolphenyl ether compounds present was added. On completion of the distillation, a resin solution was obtained which was quite viscous and had a gel time of 3 minutes at 150° C. and a resin solids content of 35%. After treatment with barium oxide to remove the acid catalyst (in accordance with the procedure described in Example 5) the gel time increased to about 5 to 6 minutes at 150° C. The gelled resin was amber clear in color, brittle and adhered tightly to an aluminum surface.

*Example 10*

A mixture of etherified methylolphenol compounds prepared as described in Example 1 was azeotropically distilled in accordance with the procedure described in accordance with Example 4. An amount of para cresol equal to 10 mole percent of the etherified methylolphenol compounds was added to the azeotropic mixture. The resin solution obtained upon completion of the distillation reaction had a gel time of about 2 minutes at 150° C., a solids content of 28% and a relatively low viscosity. Upon removal of the acid catalyst by treatment with calcium oxide (according to the procedure of Example 5) the gel time was 6 minutes at 110° C. and 2 minutes at 150° C. Thin strips of copper and aluminum were dipped in the resin solution and cured at 130° C. for 30 minutes. The resin formed a transparent amber film on the strips which adhered tightly thereto. The film was tough and flexible, withstanding several 180° bends of the metal strips without cracking.

While the present invention has been described with reference to particular embodiments thereof, it will be understood, of course, that certain changes, substitutions and modifications may be made therein without departing from its true scope.

We claim as our invention:

1. The process which comprises establishing a mixture of methylolphenol compounds in which the ratio of methylol groups to phenolic nuclei is within the range of from 1.0 to 1.5, etherifying the phenolic hydroxyl groups on the methylolphenol compounds, and azeotropically distilling the etherified methylolphenol compounds in an anhydrous, non-alcoholic, water-immiscible solvent therefor in the presence of an acid employed in an amount and concentration sufficient to maintain the solution at a pH no greater than 4, when measured in an equal parts mixture with water, to cause methylol groups on certain of the etherified methylolphenol compounds to react with hydrogen atoms located on other etherified methylolphenol compounds in positions ortho and para to the etherified hydroxyl group to produce a resin of methylene bridged phenol units in which a predetermined number of the phenolic hydroxyl groups have been converted to ether groups.

2. The process as set forth in claim 1 wherein the mixture of methylolphenol compounds is prepared by reacting an aldehyde and a phenol in proportions whereby there is produced a first mixture of methylolphenol compounds wherein the ratio of methylol groups to phenolic nuclei is greater than 1.5, and thereafter adding to the first mixture a phenol ether having only enough methylol groups whereby a second mixture of methylolphenol compounds is produced wherein the ratio of methylol groups to phenolic nuclei is within the range of 1.0 to 1.5.

3. The process as set forth in claim 1 wherein the resin product is treated with alkaline earth metal oxide to remove acid therefrom.

4. The process as set forth in claim 1 wherein the resin product is dissolved in a solvent, heated in the presence of a powdered alkaline earth metal oxide to neutralize the acid present in the product, and separated from the neutralized acid.

5. The process which comprises establishing a mixture of methylolphenol compounds in which the ratio of methylol groups to phenolic nuclei is within the range of from 1.0 to 1.5, etherifying substantially all of the phenolic hydroxyl groups on the methylolphenol compounds, admixing the etherified methylolphenol compounds with up to about 20 mole percent, based on the moles of the methylolphenol compounds, of a phenol having a free phenolic hydroxyl group and at least one free hydrogen atom in the positions ortho and para to the hydroxyl group, and azeotropically distilling the resultant mixture in an anhydrous, non-alcoholic, water-immiscible solvent therefor in the presence of an acid employed in an amount and concentration sufficient to maintain the solution at a pH no greater than 4, when measured in an equal parts mixture with water, whereby methylol groups on certain of the etherified methylolphenol compounds react both with hydrogen atoms on other etherified methylolphenol compounds and hydrogen atoms on the phenol having the free phenolic hydroxyl group to produce a resin of methylene bridged phenol units having both a small proportion of phenolic hydroxyl groups and etherified phenolic hydroxyl groups.

References Cited in the file of this patent

UNITED STATES PATENTS

| | | |
|---|---|---|
| 2,341,062 | Stager | Feb. 8, 1944 |
| 2,470,130 | Bender et al. | May 17, 1949 |
| 2,659,710 | Martin | Nov. 17, 1953 |

FOREIGN PATENTS

| | | |
|---|---|---|
| 511,511 | Great Britain | Aug. 21, 1939 |

OTHER REFERENCES

"Chemistry of Synthetic Resins," Ellis; volume I; page 350, lines 22–30.